United States Patent
Iwakura et al.

(10) Patent No.: US 7,022,434 B2
(45) Date of Patent: *Apr. 4, 2006

(54) NICKEL-METAL HYDRIDE STORAGE BATTERY AND PRODUCTION METHOD THEREOF

(75) Inventors: Chiaki Iwakura, Sakai (JP); Naoji Furukawa, Yawata (JP); Yoichi Izumi, Moriguchi (JP); Yoshio Moriwaki, Hirakata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 375 days.

This patent is subject to a terminal disclaimer.

(21) Appl. No.: 10/333,043

(22) PCT Filed: Jul. 2, 2001

(86) PCT No.: PCT/JP01/05733

§ 371 (c)(1),
(2), (4) Date: Jan. 15, 2003

(87) PCT Pub. No.: WO02/07247

PCT Pub. Date: Jan. 24, 2002

(65) Prior Publication Data

US 2004/0005503 A1 Jan. 8, 2004

(30) Foreign Application Priority Data

Jul. 17, 2000 (JP) ............................. 2000-216601

(51) Int. Cl.
*H01M 6/14* (2006.01)
(52) U.S. Cl. .................... 429/303; 429/300; 429/223; 429/218.2; 429/206; 429/249; 429/254; 29/623.1

(58) Field of Classification Search ................ 429/303, 429/300, 223, 206, 218.2, 249, 254; 29/623.1
See application file for complete search history.

(56) References Cited

U.S. PATENT DOCUMENTS

| 5,541,019 A | 7/1996 | Anani et al. |
| 6,797,436 B1 * | 9/2004 | Takizawa et al. ........... 429/303 |

FOREIGN PATENT DOCUMENTS

| CN | 1076313 A | | 9/1993 |
| JP | 58-30070 | * | 2/1983 |
| JP | 05-121061 A | | 5/1993 |
| JP | 05-258767 A | | 10/1993 |
| JP | 07-161343 A | | 6/1995 |
| JP | 9-312152 | * | 12/1997 |
| JP | 09-312152 A | | 12/1997 |
| JP | 11-260339 A | | 9/1999 |

OTHER PUBLICATIONS

T.Keily et al., "Research And Development In Non-Mechanical Electrical Power Sources", *Power Sources* 12, pp. 393-410, (1989).

* cited by examiner

*Primary Examiner*—Laura Weiner
(74) *Attorney, Agent, or Firm*—Akin Gump Strauss Hauer & Feld, LLP

(57) ABSTRACT

In order to obtain a nickel-metal hydride storage battery having a long cycle life and a low self-discharge rate, in a nickel-metal hydride storage battery comprising: a positive electrode containing nickel hydroxide; a negative electrode containing a hydrogen storage alloy; a separator interposed between the positive and negative electrodes; and an electrolyte comprising an aqueous alkaline solution, a water absorbent polymer, a water repellent and an aqueous alkaline solution are added into the separator. This battery can be produced with low cost.

11 Claims, 2 Drawing Sheets

NICKEL-METAL HYDRIDE STORAGE BATTERY AND PRODUCTION METHOD THEREOF

CROSS-REFERENCE TO RELATED APPLICATION

This application is a Section 371 of International Application No. PCT/JP01/05733, filed Jul. 2, 2001, the disclosure of which is incorporated herein by reference.

TECHNICAL FIELD

The present invention relates to a nickel-metal hydride storage battery. More specifically, the present invention relates to a nickel metal hydride storage battery having an improved separator.

BACKGROUND ART

Conventional nickel-metal hydride storage batteries are composed of a positive electrode containing nickel hydroxide, a negative electrode containing a hydrogen storage alloy, a separator interposed between the positive and negative electrodes, and an electrolyte. In the separator, a non-woven fabric made of polyolefin is used, and in the electrolyte, an aqueous solution of potassium hydroxide is used (Power Sources 12, Research and Development in Non-mechanical Electrical Power Sources, 1989, p 393–410.).

The conventional nickel-metal hydride storage batteries have a problem such that, during the repeated charge/discharge cycles at a high temperature, the hydrogen storage alloy contained in the negative electrode is corroded to produce an oxide or a hydroxide because the alloy reacts with the electrolyte. This reaction consumes the water in the electrolyte. Accordingly, when the alloy is corroded, the amount of the electrolyte within the separator is decreased to increase the internal resistance of the battery, resulting in lower cycle characteristic. Additionally, since the constituent element of the hydrogen storage alloy dissolved in the electrolyte can migrate to the positive electrode through the separator, the self-discharge of the battery is accelerated.

In order to cope with the corrosion of the hydrogen storage alloy, changes in the hydrogen storage alloy composition, surface treatments of the alloy and the like have been examined.

In order to deal with the increase in the internal resistance of a battery, improvements in the separator has been investigated. If the hydrophilicity of the separator is improved, the internal resistance of the battery is unlikely to increase even if the amount of the electrolyte in the battery is decreased. This, however, arises problems such as the requirement of a step of enhancing the hydrophilicity of the separator, and the increase in the production cost of the battery.

With regard to the self-discharge, Japanese Laid-Open Patent Publication No. Hei 5-258767 proposes to include a water absorbent polymer in an electrolyte in order to reduce self-discharge during storage of the battery. This method, however, has a disadvantage that the water absorbent polymer is distributed unevenly between the positive and negative electrodes. The uneven distribution of the water absorbent polymer leads to uneven proceeding in the battery reaction; thus, the cycle life of the battery cannot be expected to improve.

U.S. Pat. No. 5,541,019 proposes to use a polymer electrolyte in a nickel-metal hydride storage battery in order to prevent the leakage of the electrolyte. The polymer electrolyte has low gas permeability. Accordingly, a sealed nickel-metal hydride storage battery containing a polymer electrolyte has a disadvantage that the internal pressure of the battery tend to increase if a gas is generated by decomposition of water due to overcharge.

DISCLOSURE OF INVENTION

An object of the present invention is to provide a low-cost nickel-metal hydride storage battery with a longer cycle life and less self-discharge.

The present invention relates to a nickel-metal hydride storage battery comprising a positive electrode containing nickel hydroxide, a negative electrode containing a hydrogen storage alloy, and a separator containing a gel electrolyte interposed between the positive and negative electrodes, characterized in that the gel electrolyte comprises a water absorbent polymer, a water repellent and an aqueous alkaline solution.

The water absorbent polymer comprises a cross-linked polymer having at least one kind of monomer unit selected from the group consisting of an acrylic acid salt unit and a methacrylic acid salt unit.

The water repellent comprises at least one selected from the group consisting of fluorinated carbon and fluorocarbon resin. As the fluorocarbon resin, for instance, polytetrafluoroethylene can be used.

The separator may comprise only the gel electrolyte. The separator may also contain a core material comprising a non-woven fabric. The non-woven fabric preferably comprises polyolefin or polyamide.

The separator is preferably attached to a surface of at least one of the positive and negative electrodes.

It is preferred that the separator further contains a binder in order to improve the moldability and the durability thereof. The binder comprises at least one selected from the group consisting of polyethylene, polypropylene, carboxymethyl cellulose, styrene butadiene rubber and polyvinyl alcohol.

The separator layer preferably has an air permeability of 5 to 100 ml/cm$^2$·s under a pressure difference of 120 to 130 Pa.

The separator layer preferably has a thickness of 20 to 200 µm.

The present invention further relates to a method for producing a nickel-metal hydride storage battery comprising: (1) a first step of producing a positive electrode containing nickel hydroxide and a negative electrode containing a hydrogen storage alloy; (2) a second step of producing a separator containing a gel electrolyte from a mixture obtained by mixing a water absorbent polymer, a water repellent and an aqueous alkaline solution; (3) a third step of obtaining an electrode group by laminating the positive and negative electrodes with the separator interposed therebetween; and (4) a forth step of assembling a nickel-metal hydride storage battery by using the electrode group.

The second step may comprise a step of forming a sheet-like separator from a mixture obtained by mixing a water absorbent polymer, a water repellent and an aqueous alkaline solution.

The second step may also comprise a step of applying a mixture obtained by mixing a water absorbent polymer, a water repellent and an aqueous alkaline solution on a surface of at least one of the positive and negative electrodes, and thereby forming a separator attached to the surface.

BEST MODE FOR CARRYING OUT THE INVENTION

Figure 1:
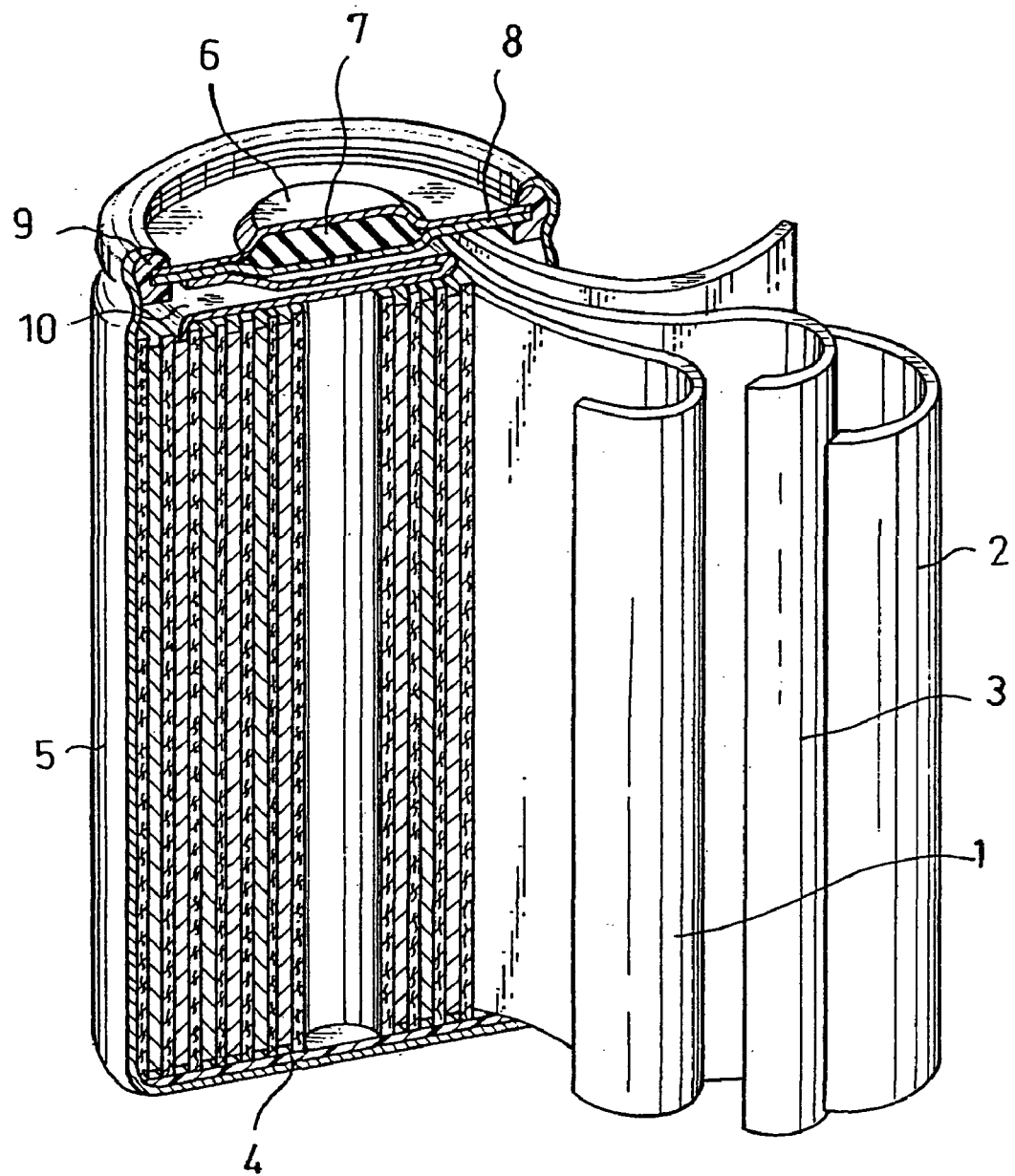
FIG. 1 is a longitudinal sectional view of one example of a nickel-metal hydride storage battery of the present invention.

A nickel-metal hydride storage battery of the present invention comprises a positive electrode containing nickel hydroxide, a negative electrode containing a hydrogen storage alloy, and a separator containing a gel electrolyte comprising a water absorbent polymer, a water repellent and an aqueous alkaline solution interposed between the positive and negative electrodes.

The separator has proper ion conductivity because it contains an aqueous alkaline solution.

The separator contains a gel electrolyte comprising a water absorbent polymer and an aqueous alkaline solution. Therefore, the separator has an excellent retention of an aqueous alkaline solution, and the battery's internal resistance is unlikely to rise. In addition, since the electrolyte is in a gel form, the corrosion of the hydrogen storage alloy is unlikely to proceed; thus, the battery's self-discharge is suppressed.

As the water absorbent polymer, any polymer having a hydrophilic group can be used without specific limitation. For example, an alkali metal salt of a polymer can be used. Examples of the polymer include polyacrylic acid, polymethacrylic acid, a copolymer of acrylic acid and methacrylic acid, a copolymer of isobutylene and maleic acid, poly(2-acrylamide-2-metylpropanesulfonic acid), poly(acryloxypropane sulfonic acid), poly(vinyl phosphonic acid). These polymers have a lot of acidic groups, but all acidic groups do not necessarily need to form the alkali metal salt. The water absorbent polymers may be used singly or in combination of two or more. As the water absorbent polymer, potassium polyacrylate, sodium polyacrylate, potassium polymethacrylate and sodium polymethacrylate are particularly preferred.

The water absorbent polymer is preferably a cross-linked polymer. In order to cross-link a water absorbent polymer, for instance, a cross-linking agent such as divinyl-benzene may be added during the preparation of a polymer such as polyacrylic acid, polymethacrylic acid and a copolymer of acrylic acid and methacrylic acid. Alternatively, an ionomer obtained by crosslinking a polymer such as polyacrylic acids polymethacrylic acid, and a copolymer of acrylic acid and methacrylic acid with metal ions may be used.

The separator has excellent gas permeability because it contains a water repellent. Accordingly, even if the battery is overcharged, the internal pressure is unlikely to be high.

Examples of the water repellent are fluorinated carbon and fluorocarbon resin.

The molar ratio of fluorine atoms to carbon atoms contained in the fluorinated carbon is usually 1:1. A fluorinated carbon represented by $CF_x(x<1)$ may also be used.

As the fluorocarbon resin, for instance, polytetrafluoroethylene can be used.

The separator can comprise only a gel electrolyte, but it may contain a conventional core material. As the core material, a non-woven fabric comprising polyolefin or polyamide can be used. With the use of such core material, the tensile strength of the separator is increased, resulting in easy handling of the separator. Accordingly, the separator with a core material is unlikely to be damaged even when it is wound with positive and negative electrodes sandwiching the separator.

The separator with a core material can be obtained by impregnating the core material with a water absorbent polymer, or applying a water absorbent polymer onto the core material.

Usually, a non-woven fabric cannot be used as the separator unless it is subjected to a hydrophilic treatment or the like to enhance liquid absorptivity. When a separator obtained by impregnating a non-woven fabric with a water absorbent polymer, or applying a water absorbent polymer onto a non-woven fabric is used, however, it is unnecessary to subject the non-woven fabric to a hydrophilic treatment because the water absorbent polymer is hydrophilic. Accordingly, in the present invention, the production cost of the battery can be reduced.

A separator preferably has a thickness of 5 to 200 μm. If the thickness is too thin, the strength of the separator becomes insufficient, causing a problem such as an internal short circuit in the battery. On the contrary, if the separator has a thickness of over 200 μm, other problems arise such as a bulky battery, small air permeability of the separator and large internal resistance of the battery.

Next, one example of the method for producing a nickel-metal hydride storage battery of the present invention will be described referring to FIG. 1. FIG. 1 is a longitudinal sectional view of one example of the cylindrical nickel-metal hydride storage battery of the present invention. In FIG. 1, the numerals 1, 2 and 3 respectively represents a positive electrode containing nickel hydroxide, a negative electrode containing a hydrogen storage alloy and a separator.

The positive electrode 1 can be obtained by applying a positive electrode material mixture onto a current collector. The negative electrode 2 can be obtained by applying a negative electrode material mixture onto a current collector. As the current collector, a metal foil, expanded metal or the like can be used.

The positive electrode 1 and the negative electrode 2 can be produced by a conventional method. The produced positive and negative electrodes are usually in the shape of a belt.

The separator 3 contains a gel electrolyte comprising a water absorbent polymer, a water repellent and an aqueous alkaline solution. As described above, the separator 3 may have a core material made of a non-woven fabric.

In order to form the separator, first, a water absorbent polymer, a water repellent and an aqueous alkaline solution are mixed. A binder may be added to the mixture in this stage if necessary.

The amount of the water repellent per 100 parts by weight of the total amount of the water absorbent polymer and the aqueous alkaline solution is preferably 1 to 8 parts by weight. The amount of the binder per 100 parts by weight of the total amount of the water absorbent polymer and the aqueous alkaline solution is preferably 0.1 to 2 parts by weight. When the amount of the water repellent is too small, the gas permeability of the separator will be small. On the contrary, when the amount of the water repellent is too large, the internal resistance of the battery will be large. The amount of the aqueous alkaline solution may be changed according to the kind of water absorbent polymer. The aqueous alkaline solution preferably has a specific gravity of 1.1 to 1.4 g/ml.

The mixture comprising the water absorbent polymer, the water repellent and the aqueous alkaline solution is uniformly applied onto a surface of a substrate whose surface is smooth, which is then dried to some extent to give a gel. A desired separator can be obtained by peeling the obtained gel away from the substrate. Alternatively, the above-mentioned mixture is impregnated into a non-woven fabric, or applied onto a non-woven fabric, which is then dried to some extent to give a separator having the non-woven fabric as a core material.

Then, the obtained positive electrode 1 and negative electrode 2 are laminated with the separator 3 interposed therebetween, which is then spirally wound to form an electrode group. The electrode group is housed in a battery case 5 after an insulating plate 4 is provided at the bottom of the electrode group. Subsequently, an aqueous alkaline solution is fed in the battery case 5.

The mixture comprising the water absorbent polymer, the water repellent and the aqueous alkaline solution may be applied directly on one surface or both surfaces of the electrode plate. In this case, the formed separator is closely attached to the electrode surface. When the electrode plate with the separator closely attached is used, it is unnecessary to laminate three members including the positive and negative electrodes and the separator, and wind them. In addition, the separator is unlikely to slide.

The opening of the battery case 5 is sealed with a sealing member 8. The sealing member 8 is integrated with a cap 6 having a positive electrode terminal. The sealing member 8 is further equipped with a safety valve made of a rubber 7 which blocks a hole communicating the inside and the outside of the battery case. The sealing member 8 also has an insulating gasket 9 on the periphery thereof. The gasket 9 is provided in order to seal the battery as well as to insulate the positive electrode terminal from the negative electrode terminal. If a gas generates in the battery and the internal pressure increases, the rubber 7 deforms, thereby the gas is released through the hole communicating the inside and the outside of the battery case.

The positive electrode constituting the electrode group has a positive electrode lead 10. The positive electrode lead 10 is connected to the positive electrode terminal of the sealing member 8. Part of the negative electrode located in the outermost of the electrode group contacts the inner face of the battery case 5 made of metal. The outer surface of the battery case is covered with an insulating material except the bottom. The bottom outer surface of the battery case serves as the negative electrode terminal.

In the following, the present invention will be concretely described based on Examples.

EXAMPLE 1

(i) Production of Positive Electrode

A nickel hydroxide containing Co and Zn was used as the positive electrode active material. A mixture obtained by mixing 100 parts by weight of the active material, 10 parts by weight of cobalt hydroxide and an appropriate amount of water was filled into micropores of foamed nickel sheet with a thickness of 1.2 mm. The foamed nickel sheet in which the mixture was filled was dried, rolled out and cut to give a positive electrode. A positive electrode lead was provided to the positive electrode.

(ii) Production of Negative Electrode

As the negative electrode material, a well-known $AB_5$ type hydrogen storage alloy was used. The hydrogen storage alloy was ground into particles with a mean particle size of 35 μm, which was then treated with alkali. Subsequently, the treated alloy powder was mixed with an appropriate amount of binder and water. The obtained mixture was applied to a punched metal substrate plated with nickel. The substrate applied with the mixture was dried, rolled out and cut to give a negative electrode. A negative electrode lead was provided to the negative electrode.

(iii) Production of Separator 10 g of cross-linked potassium polyacrylate, 125 g of aqueous solution of potassium hydroxide with a specific gravity of 1.25 g/ml, 0.1 g of carboxymethyl cellulose and 6.75 g of polytetrafluoroethylene powder were mixed and then gelated. The obtained gel was applied on a surface of a glass plate whose surface is smooth, which was then dried and the resulting sheet was peeled away. The obtained sheet of gel was rolled out until it reached a thickness of 150 μm, and cut to give a separator. The obtained separator had an air permeability of 20 $ml/cm^2 \cdot s$ under a pressure difference of 124 Pa.

(iv) Assembly of Battery

The positive and negative electrodes were laminated with the separator interposed therebetween, which was then wound to give an electrode group. The electrode group was provided with a ring-like insulating plate at the bottom thereof, which was then housed in an AA sized battery case. The negative electrode lead was spot-welded to the bottom of the battery case. Then, an aqueous solution of potassium hydroxide with a specific gravity of 1.3 g/ml was fed into the battery case as an electrolyte. An insulating plate was placed on the top of the electrode group. Finally, the opening of the battery case was sealed with a sealing member equipped with a cap having a positive electrode terminal, a safety valve and a gasket. Before the sealing, the positive electrode lead was electrically connected to the positive electrode cap. Thereby, a sealed battery was produced. This battery was referred to as "Battery A".

(v) Battery Evaluation

Six batteries A with an initial nominal capacity of 1200 mAh were prepared. Three of them were put through the repetition of charge and discharge at 45° C. in order to determine the cycle life. The charge current was 0.1 A, the charge time was 12 hours, the interval between charge and discharge was 1 hour, the discharge current was 0.2 A, and the end-of-discharge voltage was 0.8 V. As a result, the discharge capacity at the initial charge/discharge cycle was about 1000 mAh. In addition, the average cycle number needed to reach a discharge capacity of 500 mAh was 350.

Next, the other three batteries were used to determine the self-discharge characteristic. First, at a temperature of 20° C., each battery was charged at 120 mA for 15 hours and discharged at 240 mA to a battery voltage of 1.0 V; thereafter, the discharge capacity of each battery was measured. Subsequently, the each battery was charged at 120 mA for 15 hours at 20° C., which was then stored for 30 days at 45° C. When the battery temperature dropped to 20° C. after the storage, the discharge capacity was measured in the same manner as above. Eventually, the percentage (%) of the battery capacity obtained after the storage at 45° C. for 30 days to that before the storage was calculated. The obtained result was referred to as "self-discharge rate". The average self-discharge rate of Battery A was 20%.

Meanwhile, a separator having an air permeability of less than 5 $ml/cm^2 \cdot s$ was produced, which was then used to manufacture a battery such as that in Example 1. The obtained battery was evaluated in the same manner as Example 1 to find that the self-discharge rate was decreased. When the charge/discharge cycle was repeated, however, the internal pressure of the battery was increased; thus, the cycle life was not increased.

Similarly, a separator having an air permeability of greater than 100 ml/cm$^2$·s was produced, which was then used to manufacture a battery such as that in Example 1. The obtained battery was evaluated in the same manner as Example 1 to find that the self-discharge rate was decreased. However, the initial discharge capacity was decreased to some extent.

Comparative Example 1

A battery was produced in the same manner as Example 1, except that a hydrophilic-treated polypropylene nonwoven fabric was used, instead of using the separator obtained in Example 1. This battery was denoted as "Battery B".

Battery B was evaluated in the same manner as Example 1. The discharge capacity of Battery B at the initial charge/discharge cycle was about 1000 mAh.

The average cycle number needed to reach a discharge capacity of 500 mAh was 250, which was about 100 cycles lower than that of Battery A.

The average self-discharge rate of Battery B was 38%, which was 18% higher than that of Battery A.

Figure 2:
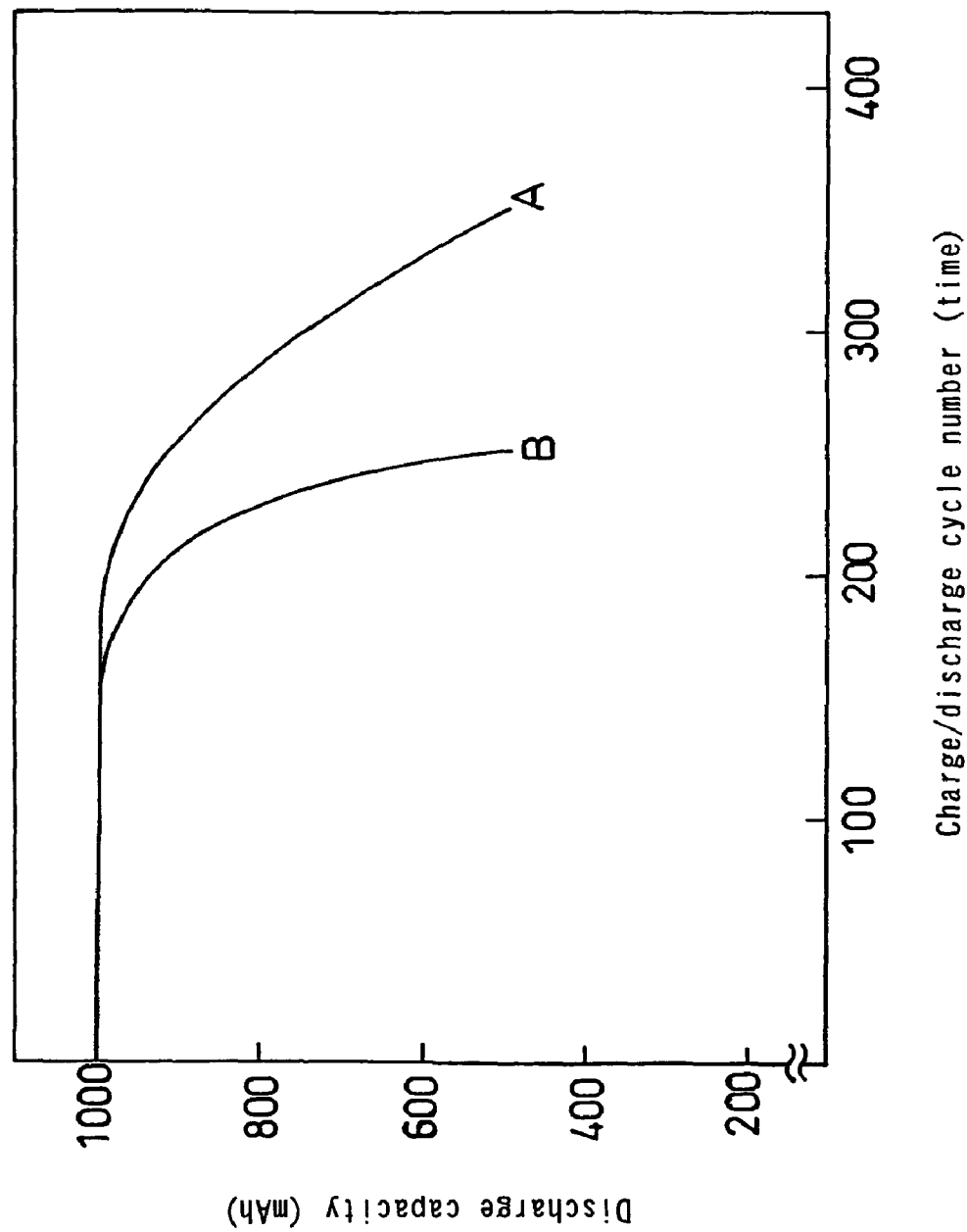
FIG. 2 is a graph showing a relationship between the discharge capacity and the charge/discharge cycle number of Batteries A and B.

The above results show that Battery A extremely excels in cycle life and self-discharge characteristics as compared to Battery B. FIG. 2 shows a relationship between the discharge capacity and the charge/discharge cycle number of Battery A and B.

EXAMPLE 2

A battery was produced in the same manner as Example 1, except that fluorinated carbon (CF$_{1.0}$) was used instead of polytetrafluoroethylene when producing the separator. This battery was denoted as "Battery C".

Battery C was evaluated in the same manner as Example 1. The discharge capacity of Battery C at the initial charge/discharge cycle was about 1000 mAh.

The average cycle number needed to reach a discharge capacity of 500 mAh was 355.

EXAMPLE 3

A mixture was prepared by mixing 10 g of crosslinked potassium polyacrylate, 125 g of aqueous solution of potassium hydroxide with a specific gravity of 1.25 g/ml, 0.1 g of carboxymethyl cellulose and 6.75 g of polytetrafluoroethylene powder. The obtained mixture was applied on the polypropylene non-woven fabric used in Comparative Example 1, which was then dried to give a separator with a thickness of 150 μm. The obtained separator had an air permabililty of about 15 ml/cm$^2$·s under a pressure difference of 124 Pa.

A battery was produced in the same manner as Example 1, except that this separator was used. This battery was denoted as "Battery D".

Battery D was evaluated in the same manner as Example 1.

The discharge capacity of Battery D at the initial charge/discharge cycle was about 1000 mAh.

The average cycle number needed to reach a discharge capacity of 500 mAh was 320.

EXAMPLE 4

A mixture was prepared by mixing 10 g of crosslinked potassium polyacrylate, 125 g of aqueous solution of potassium hydroxide with a specific gravity of 1.25 g/ml, 0.1 g of carboxymethyl cellulose and 6.75 g of polytetrafluoroethylene powder. The obtained mixture was applied on the both surfaces of the positive and negative electrodes used in Example 1, which was dried to some extent. As a result, separator layers that were closely attached to the both surfaces of the positive and negative electrodes were formed. The positive and negative electrodes having the separator layers attached to both surfaces thereof were laminated; thereafter, the thickness of the separator layer between the positive and negative electrodes was measured to be about 140 μm.

A battery was produced in the same manner as Example 1, except that the stack of the positive and negative electrodes with the separators attached to both surfaces thereof was spirally wound to form an electrode group. This battery was denoted as "Battery E".

Battery E was evaluated in the same manner as Example 1.

The discharge capacity of Battery E at the initial charge/discharge cycle was about 1000 mAh.

The average cycle number needed to reach a discharge capacity of 500 mAh was 350.

INDUSTRIAL APPLICABILITY

According to the present invention, a low-cost nickel-metal hydride storage battery having a long cycle life and small self-discharge can be obtained.

The invention claimed is:

1. A nickel-metal hydride storage battery comprising a positive electrode containing nickel hydroxide, a negative electrode containing a hydrogen storage alloy, and a separator containing a gel electrolyte interposed between said positive and negative electrodes, characterized in that said gel electrolyte comprises a water absorbent polymer, a water repellent material and an aqueous alkaline solution.

2. The nickel-metal hydride storage battery in accordance with claim 1, wherein said water absorbent polymer comprises a cross-linked polymer having at least one kind of monomer unit selected from the group consisting of an acrylic acid salt unit and a methacrylic acid salt unit.

3. The nickel-metal hydride storage battery in accordance with claim 1, wherein said water repellent material comprises at least one selected from the group consisting of fluorinated carbon and fluorocarbon resin.

4. The nickel-metal hydride storage battery in accordance with claim 1, wherein said separator comprises a core material comprising a non-woven fabric, and said non-woven fabric comprises polyolefin or polyamide.

5. The nickel-metal hydride storage battery in accordance with claim 1, wherein said separator is attached to a surface of at least one of said positive and negative electrodes.

6. The nickel-metal hydride storage battery in accordance with claim 1, wherein said separator further comprises at least one binder selected from the group consisting of polyethylene, polypropylene, carboxymethyl cellulose, styrene butadiene rubber and polyvinyl alcohol.

7. The nickel-metal hydride storage battery in accordance with claim 1, wherein said separator has an air permeability of 5 to 100 ml/cm$^2$·s under a pressure difference of 120 to 130 Pa.

8. The nickel-metal hydride storage battery in accordance with claim 1, wherein said separator has a thickness of 20 to 200 μm.

9. A method for producing a nickel-metal hydride storage battery comprising:
   (1) a first step of producing a positive electrode containing nickel hydroxide and a negative electrode containing a hydrogen storage alloy;
   (2) a second step of producing a separator containing a gel electrolyte from a mixture obtained by mixing a water absorbent polymer, a water repellent material and an aqueous alkaline solution;
   (3) a third step of obtaining an electrode group by laminating said positive and negative electrodes with said separator interposed therebetween; and
   (4) a fourth step of assembling a nickel-metal hydride storage battery by using said electrode group.

10. The method for producing a nickel-metal hydride storage battery in accordance with claim 9, wherein said second step comprises a step of forming a sheet-like separator from said mixture.

11. The method for producing a nickel-metal hydride storage battery in accordance with claim 9, wherein said second step comprises a step of applying said mixture on a surface of at least one of said positive and negative electrodes, and thereby forming a separator attached to said surface.

* * * * *